Patented June 5, 1945

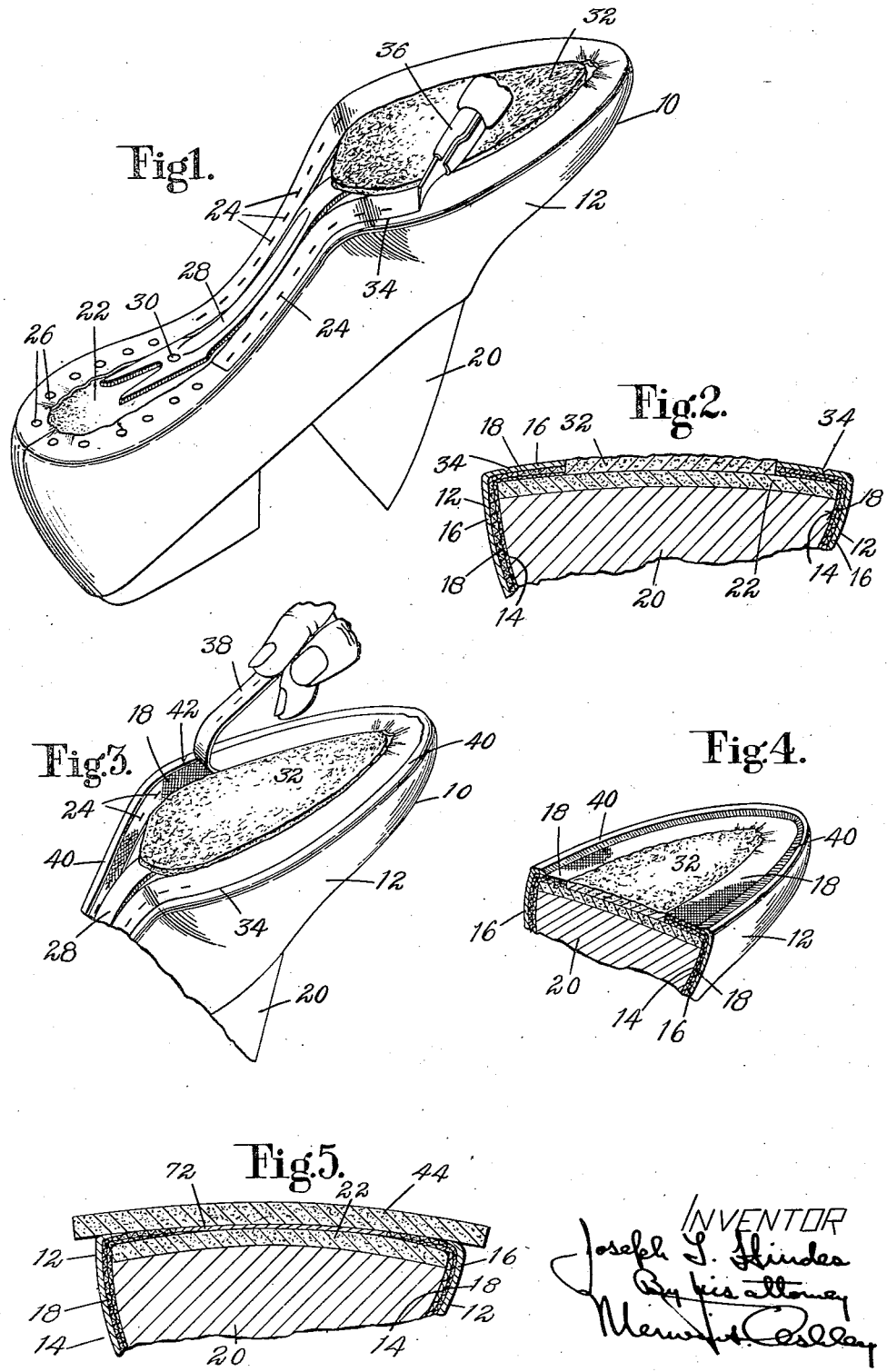

2,377,421

UNITED STATES PATENT OFFICE 2,377,421

METHOD OF MAKING SHOES

Joseph T. Hindes, Malden, Mass., assignor to United Shoe Machinery Corporation, Flemington, N. J., a corporation of New Jersey Application December 31, 1942, Serial No. 470,794

5 Claims. (Cl. 12—142)

This invention relates to methods of making shoes and has particular reference to the cement attachment of outsoles to shoes having uppers composed of highly polished or glossy materials.

Various materials are being used today to form shoe uppers and among these materials is vinyl resin which is a manufactured plastic material having a highly polished or glossy outer surface similar in appearance to patent leather. When it is desired to attach an outsole to such an upper by cement instead of by mechanical fastenings such as stitches or nails, the glossy outer surface of the overlasted margin of the upper interferes with the attachment because cement will not adhere readily to such a surface and consequently no adequate bond can be obtained. Moreover, the overlasted marginal portion of the vinyl resin upper cannot be roughened like a leather upper so that it will receive and retain cement because the vinyl resin is too delicate in character and too thin to withstand the action of the usual coarse wire brush used for roughing leather and, further, because the vinyl resin will not roughen up like leather or other fibrous materials but will merely lose its polished or glossy finish and become dull in appearance while remaining relatively smooth.

A principal object of the present invention is to provide an improved method of cement attaching outsoles to shoes having uppers composed of highly polished, glossy material, such as vinyl resin, thereby providing an improved shoe having a vinyl resin upper with an outsole permanently attached thereto by cement.

In the accomplishment of this and other objects, the invention provides, in accordance with one aspect, an improved method of making shoes which consists in providing an upper composed of sheet material to which cement will not readily adhere backed by material which will receive cement, and securing said upper in overlasted relation to an insole on a last. As herein illustrated, the outer layer of the upper is of laminated formation having an outer ply of vinyl resin backed by an inner layer of fabric material.

The overlasted margin of the upper is prepared for the cement attachment of the outsole by removing the vinyl resin from the fabric backing material over a substantial portion of the width of said overlasted margin to expose the fabric backing material. Sole attaching cement can then be applied to the exposed fabric backing material to cement attach the outsole to the shoe bottom, the fabric material being roughened, if desired, to remove any sheen or to raise the nap and thus render the material better adapted to receive cement. As herein illustrated, the vinyl resin is preferably removed from the overlasted margin of the upper by indenting or creasing the material along a line spaced inwardly a uniform distance from the outer edge of the margin, thereby partially separating the layer of vinyl resin without cutting completely through it, thus avoiding damage to the fabric backing material or to the lining of the upper. The strip of vinyl resin located inwardly of the indentation is then peeled away from the fabric backing material around the margin of the upper from the heel breast line at one side of the shoe, forwardly around the shank and forepart and back again to the heel breast line at the opposite side of the shoe, thereby exposing the fabric backing material for receiving the sole attaching cement over a substantial portion of the width of said overlasted margin.

With the above and other objects and aspects in view, the invention will now be described in detail in connection with the accompanying drawing and will thereafter be pointed out in the claims.

In the drawing,

Fig. 1 is a perspective view of a shoe upper composed of vinyl resin secured in overlasted relation to an insole on a last and illustrating the indenting of the overlasted margin of the upper with a heated tool;

Fig. 2 is a fragmentary transverse section through the forepart of the shoe of Fig. 1;

Fig. 3 is a perspective view of the forepart of the shoe illustrating the removal of a strip of vinyl resin from the overlasted margin of the upper;

Fig. 4 is a perspective view, similar to Fig. 3, after the overlasted margin of the upper has been roughened; and Fig. 5 is a fragmentary transverse section, similar to Fig. 2, showing an outsole attached to the shoe bottom.

In carrying out the method illustrated herein there is provided a shoe upper 10 comprising an outer layer 12 and a lining 14 (Fig. 2), the lining being preferably composed of the usual fabric material, such as canvas or duck, and the outer layer 12 being of laminated formation consisting of an outer ply 16 of vinyl resin backed by an inner ply 18 of fabric material. The vinyl resin ply 16 of the outer layer 12 preferably comprises the usual manufactured plastic sheet material of that name or sometimes called "Vinylite" which, as disclosed for example in the Nugent Patent No. 2,290,205, normally consists of polyvinyl acetate, polyvinyl chloride, a copolymer of vinyl acetate and vinyl chloride, polyvinyl acetal or other suitable vinyl resin. The vinyl resin also ordinarily contains a suitable plasticizer, such as dibutyl phthalate or dibutyl sebacate. The inner ply 18 of the laminated outer layer 12 which forms the backing for the vinyl resin outer ply 16, may consist of fabric material such, for example, as canvas, linen, silk or other fabric suitable for backing material or, as herein illustrated, it may consist of one of the manufactured fabric backing materials known commercially as "Coutene" or "Coutil." If desired, the backing material 18 may be composed of one of the various fabric materials now available containing rubber threads which are capable of stretching a limited amount such, for example, as lastex. As is well known, the vinyl resin forming the outer ply or layer 16 of the upper has the fabric backing material stuck securely to its inner side during the manufacture of the sheet material and the outer surface of the vinyl resin presents a highly polished or glossy appearance similar to patent leather.

The upper 10 is assembled on a last 20 with an insole 22 in the usual manner and the marginal portion of the upper is secured in overlasted relation to the insole, as illustrated in Fig. 1. While the precise method of lasting the upper is of no great importance it is preferable, as herein illustrated, to last the forepart by cement such, for example, as latex or other rubber cement, and to last the shank portion by either cement or metallic fastenings such as staples 24, the staples curving in the material of the insole without passing completely therethrough. The heel portion of the upper may be lasted by tacks 26 driven through the upper and insole and clinched against a metal plate on the heel portion of the last bottom. After the upper has been lasted in the manner described or in some other suitable manner, a usual metal shank piece or stiffener 28 may be applied to the shank portion of the insole and secured thereto by tacks 30, and the depression or hollow formed inwardly of the overlasted margins at the forepart of the shoe bottom may be filled in some convenient manner as, for example, by a felt filler piece 32 stuck to the outer surface of the insole.

Since it is desired in the present case to attach an outsole to the shoe bottom by cement, it is necessary to prepare the overlasted marginal portion of the vinyl resin upper for receiving cement, the vinyl resin material, as pointed out above, having a highly polished, glossy surface to which cement will not readily adhere. Accordingly, in accordance with the method disclosed herein, the overlasted marginal portion of the upper is put into a condition to receive cement by removing the vinyl resin material 16 over a substantial portion of the width of the overlasted margin of the upper, the vinyl resin preferably being removed from about the heel breast line at one side of the shoe around the forepart to the heel breast line at the opposite side thereof, thereby exposing a substantial width of the fabric backing material 18 which is much better adapted to receive cement than vinyl resin, and to which cement can in many cases be applied, if desired, without performing the usual roughening operation due to the relatively coarse texture of fabric materials.

In removing the vinyl resin outer ply 16 from the overlasted margin of the upper the vinyl resin is partially separated around said margin by making a fairly deep crease or indentation 34 in the vinyl resin ply from about the heel breast line at one side of the shoe around the shank and forepart to the heel breast line at the opposite side thereof, the indentation 34 being located along a line spaced a short distance inwardly from the outer edge of said overlasted margin or the periphery of the shoe bottom, as shown in Figs. 1 and 2. In order to insure against cutting completely through the vinyl resin ply 16 and cutting or damaging the fabric backing material 18 or the lining 14, the crease or indentation 34 is made by a heated tool 36 having a blunt point which, by reason of the heat, partially separates the vinyl resin by producing the crease or indentation 34 without passing completely through the material. Preferably, and as illustrated herein, the indentation is located between ⅛ and ¼ of an inch inwardly of the outer edge of the overlasted margin of the upper so that a relatively narrow strip of vinyl resin will be left extending around the lower edge of the shoe bottom, this strip assisting in producing close fitting sole margins in the finished shoe and insuring that the vinyl resin outer ply 16 will extend between the outsole and insole 22 to prevent any tendency of the vinyl resin to peel away from the fabric backing material during the wearing of the shoe. Moreover, it also insures that the vinyl resin will meet the outsole all around the shoe at the crease or juncture between the upper and sole member.

After the vinyl resin on the overlasted margin of the upper has been partially separated by the indentation 34 around the forepart and shank portions of the shoe, the vinyl resin which lies inwardly of the indentation is separated manually from the fabric backing material 18 at one side of the heel breast line of the shoe bottom and the vinyl resin is peeled away from the fabric backing material around the shank and forepart of the shoe bottom, as illustrated in Fig. 3, thereby removing a relatively wide strip 38 of vinyl resin from the overlasted margin of the upper and exposing the fabric backing material 18, while also leaving a narrow strip 40 of vinyl resin extending around the outer edge portion of said overlasted margin.

The vinyl resin strip 38 may be peeled off the overlasted margin of the upper to expose the fabric backing material 18 and to leave the narrow strip 40 without disturbing the overlasted condition of the inner layers of the upper because the fabric backing material was secured to the vinyl resin during the manufacture of the laminated material by reason of the adhesive character of the vinyl resin but the bond between the vinyl resin and the backing material is not as strong as the bond obtained by cement such, for example, as the latex or other cement that was used in securing the upper in lasted relation to the insole. If the shank portion of the upper was secured in overlasted position by staples, as herein illustrated, or by both staples and cement, as may sometimes be done, the vinyl resin is of such a nature that the staples will readily break through the material under a direct pull so that the strip may be pulled away from the staples without loosening them or pulling them out, thus permitting the upper to remain tightly lasted at the shank portion of the shoe after the strip of vinyl resin has been peeled off and removed.

If it should be desired to avoid any possibility of loosening the upper or staples at the shank portion of the shoe when removing the strip but nevertheless to obtain the advantages of lasting this portion of the shoe by staples rather than cement, an alternative procedure may be followed which, while it is not necessary as pointed out above, will nevertheless insure that the upper will remain tightly lasted at the shank portion of the shoe after the strip of vinyl resin has been pulled off. This alternative procedure consists in securing the shank portion of the upper as well as the forepart in overlasted relation to the insole by cement, such as latex, in the first instance, and lasting the heel portion of the upper by tacks as described above. The vinyl resin outer ply of the upper may then be indented around the overlasted margin by the heated tool 36, in the manner already described, from the heel breast line at one side of the shoe bottom to the same point at the opposite side thereof, and the strip 38 of vinyl resin located inwardly of the indentation may be peeled away from the fabric backing material, as illustrated in Fig. 3. After the strip of vinyl resin has been removed, curved staples 24 may be inserted through the fabric backing material 18 and the lining 14 at the shank portion of the shoe, thereby securing these materials permanently in overlasted relation to the insole 22.

The next step in the illustrated method consists in rendering the overlasted margin of the upper suitable for the cement attachment of an outsole after the vinyl resin strip 38 has been removed. It will be noted in Figs. 2 and 3, that the removal of the strip of vinyl resin from the backing material 18 leaves the narrow strip 40 of vinyl resin around the outer portion of the overlasted margin and produces a substantially square corner or shoulder 42 (Fig. 3) around the margin of the upper which is not eliminated by the filler piece 32 because the indentation 34 was located a considerable distance outwardly from the edge of the filler piece. In order to provide a smooth shoe bottom for receiving the outsole and to prevent the narrow marginal strip 40 of vinyl resin from separating or peeling away from the backing material due to the upstanding edge or shoulder 42 not becoming firmly cemented to the outsole, and also to prevent this shoulder from creating a gap or space between the exposed backing material 18 and the attaching face of the outsole, it is desirable to reduce the shoulder 42 so that it blends smoothly with the exposed fabric backing material to provide a relatively smooth bottom on the shoe. The shoulder 42 may be reduced or eliminated in various ways but it has been found preferable to remove it by a roughing operation with a rotary brush similar to the operation performed on the margin of a leather upper to prepare it for receiving an outsole. In the present case, however, instead of using a coarse wire brush, such as is used for roughing leather, a much finer wire brush is used which will not damage the vinyl resin or the fabric backing material but will reduce or bevel the square shoulder 42 to a relatively thin edge while removing the polish or gloss sufficiently from the inner portion of the narrow strip 40 to render it capable of receiving some cement so that this portion may become cement attached to another surface, such as the outsole, at least to an extent that will hold under ordinary conditions or unless direct force is applied to separate the surfaces.

In addition to removing the shoulder 42 and dulling up the inner portion of the vinyl resin strip 40, the roughing operation may also be utilized, if desired, to prepare the fabric backing material 18 and put it in better condition for receiving cement. The fine wire brush may, therefore, be applied to the exposed fabric backing material around the margin of the upper to roughen this material lightly without tearing or breaking through the fabric, the roughing operation preferably being only sufficient to remove any gloss or sheen from the material, if the latter is fabric, for example, such as silk, satin, or the Coutene material referred to above. In other words, the surface of the fabric material is roughened only enough to stir up the fibers and raise the nap. It should be pointed out, however, that while the fabric backing material may be roughened for receiving cement in connection with the elimination of the shoulder 42 and, as illustrated, preferably is roughened, particularly where the fabric backing material is silk, Coutene or other fabric having a natural lustre or sheen, a roughing operation on the backing material is not always necessary and may be omitted, if desired, especially when the backing material is a relatively coarse fabric such as canvas, linen or duck.

After the shoulder 42 has been removed, as shown in Fig. 4, and the fabric backing material 18 has been dulled or roughened as described above, pyroxylin cement is applied to the overlasted marginal portion of the upper in the usual manner around the forepart and shank portions of the shoe bottom and rearwardly substantially to the heel breast line, the cement being then allowed to dry. An outsole 44 is coated around the marginal portion of its inner or attaching face with pyroxylin cement in the usual manner and, after the cement has dried, the cement on both the outsole and shoe is activated by a suitable solvent, such as acetone, and the outsole is cement attached to the shoe bottom, as shown in Fig. 5. the attaching operation being performed in any usual sole attaching press adapted to hold the sole and shoe under heavy pressure until the pyroxylin cement has set. Since the square shoulder 42 on the vinyl resin strip 40 has been reduced to a thin edge, and since the inner portion of this strip has been dulled sufficiently to retain cement to cause it to adhere to another surface if put under pressure, the outsole will become cement attached to the overlasted upper across substantially the full width thereof, as illustrated in Fig. 5, and there will be no tendency for the marginal portion of the outsole to separate or pull away from the upper at the crease or joint where the outsole engages the marginal strip of vinyl resin 40 even though the outsole and upper are not stuck together at the extreme outer portion of the strip. Moreover, any spreading or widening of the crease where the upper joins the outsole will show only the glossy surface of the vinyl resin outer layer of the upper because the roughing operation, as illustrated in Fig. 4, did not extend to the outer edge of the overlasted margin of the upper.

It will be found that an outsole attached by proxylin cement to a shoe the upper of which has an outer layer composed of vinyl resin or some other highly polished, glossy material will, by the practise of the method herein disclosed, become as firmly and strongly attached to the shoe bottom as when the upper is composed of leather which has been roughened in the usual manner to receive the sole attaching cement or, in other words, the attachment of the outsole to the shoe bottom in the manner described will be permanent throughout the life of the shoe. It will also be found that it is possible by the present method to obtain just as close fitting sole margins at the shank portion of a shoe having an upper composed of vinyl resin or other highly glossed material as it is when the upper is composed of leather, fabric or similar upper materials.

Having thus described my invention, what I claim as new and desire to secure by Letters Patent of the United States is:

1. That improvement in method of making shoes which consists in providing an upper having a fabric lining and an outer layer composed of glossy sheet material to which cement will not readily adhere backed by a layer of material to which cement will more readily adhere, securing the full width of the lasting margin of the lining and outer layer of said upper in overlasted relation to an insole on a last, separating said glossy material from the backing material at a uniform distance from and close to the edge of the insole and removing the glossy layer from the remainder of the width of the overlasted margin of the upper materials, thereby leaving the lining, backing material and a portion of the glossy outer layer still secured to the insole but exposing the backing material at said margin, and cement attaching an outsole to said overlasted margin by applying cement to the outsole and to the exposed backing material at said margin.

2. That improvement in methods of making shoes which consists in providing an upper comprising an outer layer and a lining, said outer layer being composed of vinyl resin having a backing of fabric material, securing the lasting margin of said upper, including the full width of said outer layer, in overlasted relation to an insole on a last, partially separating the vinyl resin layer around the overlasted margin of the upper by forming a crease or indentation therein at a uniform distance from the edge of the insole, peeling the vinyl resin away from the fabric backing material inwardly of the indentation, thereby removing the vinyl resin and leaving the fabric backing material and the lining secured to the insole but exposing the fabric backing material around said margin, applying cement to the exposed fabric backing material and to the attaching face of an outsole, and pressing the outsole against said overlasted margin to cement attach the outsole to the shoe.

3. That improvement in methods of making shoes which consists in providing an upper composed of a sheet of vinyl resin backed by an inner layer of fabric material adhesively secured thereto, securing said upper in overlasted relation to an insole on a last, partially separating the vinyl resin around the overlasted margin of the upper along a line spaced a uniform distance inwardly from the outer edge of said margin, peeling the vinyl resin away from the fabric backing material inwardly of said line without disturbing the overlasted condition of said fabric backing material, thereby exposing the fabric backing material, roughening the exposed backing material sufficiently to raise a nap thereon, and cement attaching an outsole to said upper by applying cement between said outsole and the exposed roughened backing material.

4. That improvement in methods of making shoes which consists in providing an upper having a lining and an outer layer composed of a sheet of vinyl resin backed by a layer of fabric material, securing the upper including the outer layer in overlasted relation to an insole on a last, indenting the vinyl resin by a dull heated tool without cutting completely therethrough around the overlasted margin of the upper along a line spaced inwardly from the outer edge of said margin a distance substantially less than the full width thereof, peeling away from said backing material the strip of vinyl resin located inwardly of the indentation, thereby exposing the fabric backing material and leaving a narrow strip of vinyl resin of uniform width around the outer edge of said overlasted margin, roughening the exposed backing material and the strip of vinyl resin remaining around said margin, applying pyroxylin cement to the exposed fabric backing material and to the remaining strip of vinyl resin, applying pyroxylin cement to the attaching face of an outsole, and permanently attaching the outsole to said overlasted margin by means of the pyroxylin cement on the exposed fabric backing material and remaining strip of vinyl resin and on the attaching face of the outsole.

5. That improvement in methods of making shoes which consists in providing an upper composed of a sheet of vinyl resin having a backing of smooth fabric backing material, securing the full width of the lasting margin of the forepart of said upper in overlasted relation to an insole on a last by cement and securing the full width of the lasting margin of the shank and heel portions of the upper in said relation to the insole by mechanical fastenings, partially separating the vinyl resin at the overlasted margin of the upper around the forepart and shank portions thereof by making an indentation therein spaced a short uniform distance inwardly from the outer edge of said margin, peeling off the vinyl resin from the fabric backing material around said forepart and shank portions inwardly of said indentation without disturbing the overlasted condition of the fabric backing material, thereby exposing the fabric backing material at such portion while leaving a relatively narrow strip of vinyl resin remaining around the outer edge of said margin, roughening the exposed fabric backing material and the remaining strip of vinyl resin to remove a shoulder formed where the vinyl resin was peeled off and also to render the materials better adapted for receiving cement, and applying pyroxylin cement to the roughened materials around said margin and to the inner surface of an outsole and permanently attaching the outsole to said margin by said cement.

JOSEPH T. HINDES.